April 11, 1967 J. R. MULLEN 3,313,457
METERING DISPENSER
Filed April 9, 1965 2 Sheets-Sheet 1
FIG. 2
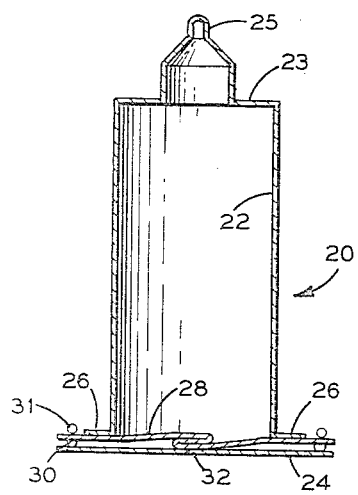
FIG. 3
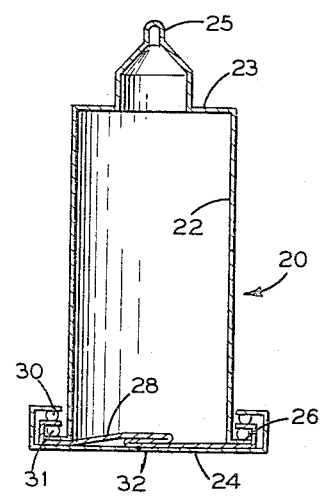
FIG. 4
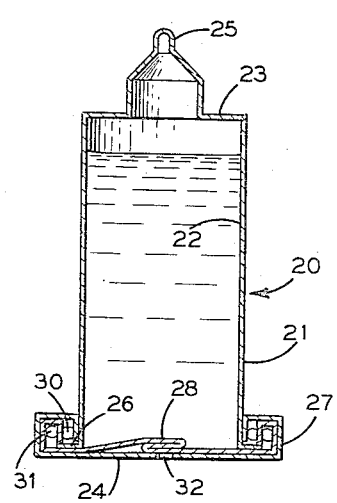
FIG. 5
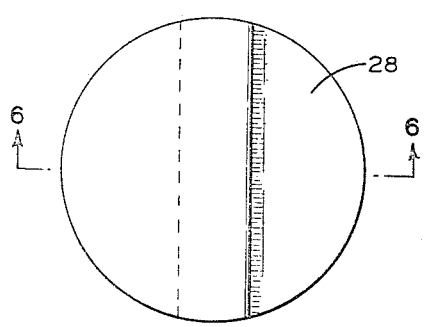
FIG. 6
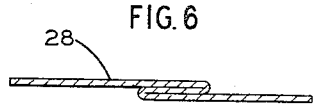
FIG. 1
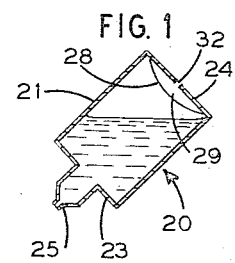
FIG. 8
FIG. 7
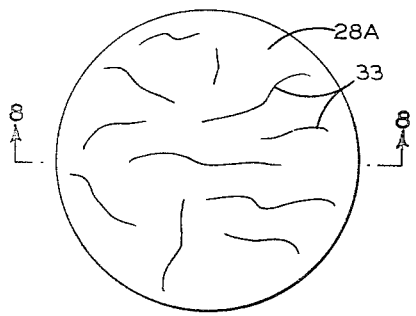
FIG. 9
FIG. 10
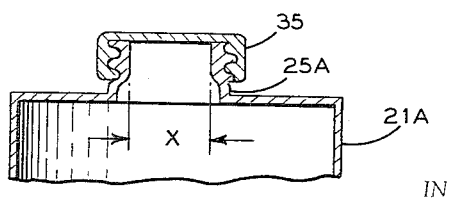
INVENTOR.
Jerry R. Mullen
BY
Archer F. Fattibene
ATTORNEY

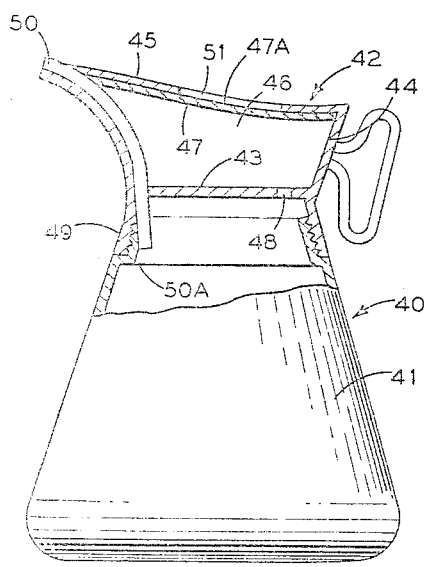
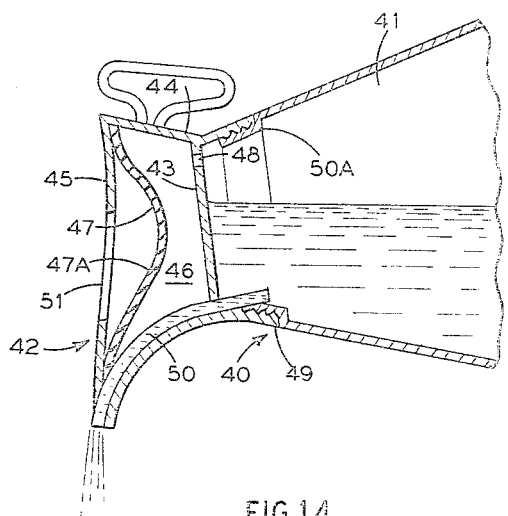
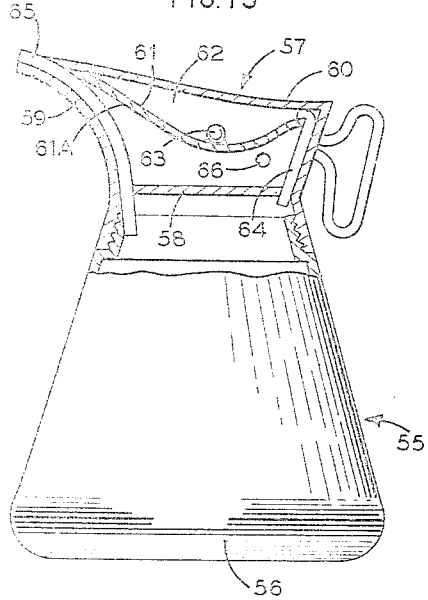
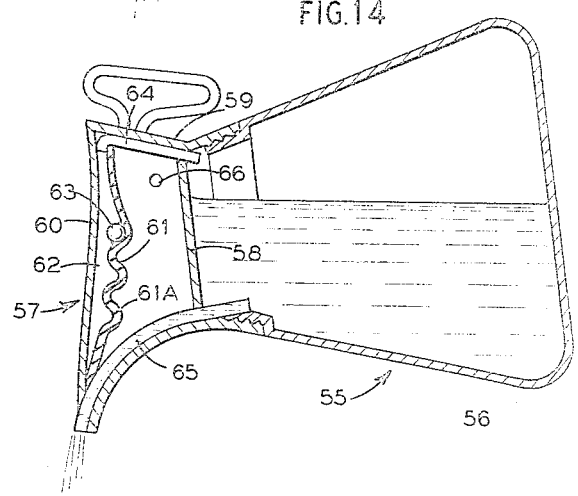

United States Patent Office 3,313,457
Patented Apr. 11, 1967

3,313,457
METERING DISPENSER
Jerry R. Mullen, Crestwood, N.Y., assignor of ten percent to Arthur T. Fattibene, Southport, Conn.
Filed Apr. 9, 1965, Ser. No. 446,827
8 Claims. (Cl. 222—386.5)

This invention relates to a dispenser for metering a flowable material contained therein, and more specifically to a metering dispenser for dispensing substantially equal predetermined amounts of flowable material therefrom upon each dispensing operation thereof.

Heretofore, considerable efforts had been made to construct a metering dispenser capable of dispensing substantially equal predetermined amounts of a flowable material upon each dispensing operation. For the most part, such efforts have resulted in a relatively complex and costly metering devices which have proven to be impractical. Consequently, most of the known metering dispensers have not achieved wide-spread commercial acceptance. Many of the known metering devices also purport to measure equal predetermined amounts of flowable material. However, it has been discovered that these so called metering devices were incapable of metering a prescribed measured amount of material with any degree of accuracy. Other purported metering dispensers cannot, due to the inherent construction thereof, function as such. There are other known dispensers which can meter only when the user performed a prescribed motion. Thus the dispensing of metered amounts from these dispensers become the function of the user, and not of the dispenser. Therefore, for one reason or another, a simple, inexpensive and reliable metering dispenser has not been heretofore attained in spite of all the effort and work which has been expended to develop a satisfactory metering dispenser.

It is therefore an object of this invention to provide a relatively simple, economic, reliable, and positive functioning metering dispenser capable of dispensing substantially equal predetermined amounts of a flowable material upon each dispensing operation.

Another object is to provide a dispenser for metering substantially equal predetermined amounts of material in which the dispensing operation is completely the function of the dispenser.

Another object is to provide a metering dispenser in which the prescribed amount of flowable material dispensed therefrom is accurately effected by positively controlling the volumetric displacement occurring within the dispenser.

Another object is to provide a metering dispenser in which the flow of material therefrom is automatically terminated upon the dispensing of the prescribed metered amount therefrom.

Another object is to provide a metering dispenser in which the amount of material to be dispensed on any given operation may be varied as may be desired by a user.

Another object is to provide a dispenser which means for positively controlling the amount of displacement air entering the dispenser so that only a corresponding amount of flowable material can be dispensed therefrom.

Another object is to provide a relatively simple structure for effecting a positive displacement of only a prescribed amount of air within the dispenser so that only a corresponding amount of flowable material is dispensed therefrom.

Still another object is to provide a novel metering device which can be readily adapted to cans and bottles of conventional constructions so as to convert the same into a metering dispenser.

The foregoing objects and other features and advantages of the instant invention are attained by a metering dispenser comprising a container portion which defines the reservoir for containing a supply of a readily flowable material, as for example, a liquid or the like. Cooperatively associated with the container portion of the dispenser, there is provided a means defining an expandable chamber capable of expanding and contracting to control the volumetric displacement occurring within the container during a dispensing operation. Accordingly the amount of material dispensed is proportional to the displacement effected by the expandable chamber.

In one form of the invention, a flexible diaphragm is disposed adjacent the bottom end wall of the dispenser to define therewith the expandable chamber which is normally collapsed by the weight of the material in the upright or non-dispensing position thereof. A vent means in the form of an aperture is formed in the bottom end wall to open the expandable chamber to the atmosphere. Thus, when the container is tilted to a dispensing position, the material seeking to flow out therefrom will cause air to be drawn in through the vent in the bottom of the container, causing the flexible diaphgram to flex inwardly as the chamber fills with air. Accordingly, an amount of material is dispensed which corresponds to the volumetric displacement of the expandable chamber. When the chamber has expanded to its maximum extent, no more displacement of the material is possible, and the dispensing ceases. Upon righting the dispenser, the weight of the remaining material in the container collapses the expandable chamber, the air therein being exhausted through the vent opening in the bottom. Upon a subsequent dispensing operation, the cycle is repeated. Thus by controlling the volumetric capacity of the expandable chamber, the amount of material dispensed on each dispensing operation is made certain regardless of the amount of material remaining.

In another form of the invention, the metering device is constructed for utilization with a container of conventional construction, such as a jar or bottle and the like. The metering device comprises a metering top in the nature of a housing which secured to the open end of the container. A flexible diaphragm is disposed within the housing to define with a wall portion thereof an expandable chamber. Means vent the expandable chamber to the interior of the container. The outer surface of the diaphragm is vented to the atmosphere. Accordingly, when a dispensing operation is to be performed, the fluid tending to be dispensed through the spout or discharge means of the container tends to draw the air of the expandable chamber into the container through the vent means, thereby causing the diaphragm to be flexed to evacuate the chamber. Accordingly, a corresponding amount of material proportional to the volumetric displacement of the air is dispensed. When the diaphragm has reached its maximum or extended position, no more air can enter the dispenser thereby automatically ceasing the flow of material even through the dispenser is maintained in its dispensing position.

In another form of the invention, the metering top comprises a housing in which the diaphragm is weighted to normally define an expandable chamber between the top of the housing and the diaphragm. Vent means vent the chamber defined to the interior of the dispenser. A second vent means vents the external surface of the diaphragm to the atmosphere. Accordingly, in effecting a dispensing operation, the movement of the dispenser to a dispensing position causes the liquid tending to flow out therefrom to draw the displacement air from the expandable chamber. In doing so the diaphragm collapses, forcing the air ahead of it. When no more air can be drawn from the chamber the flow of material from the dispenser automatically ceases. Upon righting the dispenser, the weighted diaphragm assumes its normal position.

A feature of this invention therefore resides in the provision of a metering device having diaphragm forming a flexible wall portion of an expandable chamber of a predetermined volumeteric capacity to provide the source of a limited amount of displacement air necessary to effect the dispensing of a precise metered amount of material.

Another feature resides in the provision of a relatively simple constructed metering device which can be readily incorporated in any well-known type container with a minimum, if any change in the construction therein to transform the same into a metering dispenser capable of metering therefrom equal predetermined amounts of material with great accuracy upon each dispensing operation thereof.

Another feature resides in the provision of a metering dispenser in which the dispensing operation can be simply performed independent of any prescribed movement or motion on the part of the user thereof.

Other features and advantages will become more readily apparent when considered in view of the drawings in which:

FIGURE 1 is a schematic showing of a metering dispenser of the instant invention.

FIGURES 2 to 4 illustrate the progressive steps in applying the metering means of the instant invention to a conventional can or the like to transform the same into a metering dispenser.

FIGURE 5 is a detail plan view of a flexible diaphragm utilized in the construction of the dispenser of FIGURES 1 to 4.

FIGURE 6 is a sectional view taken along line 6—6 of FIGURE 5.

FIGURE 7 illustrates a modified form of diaphragm construction.

FIGURE 8 is a sectional view of the modified diaphragm construction taken along line 8—8 of FIGURE 7.

FIGURE 9 is a sectional view of another modified diaphragm construction.

FIGURE 10 is a fragmentary portion of dispenser having a modified spout construction.

FIGURE 11 illustrates a modified form of construction having portions thereof shown in section.

FIGURE 12 is a fragmentary portion showing of the metering dispenser of FIGURE 11 illustrated in a dispensing position with portions shown in section.

FIGURE 13 is another modified form of the invention illustrated in an upright or non-dispensing position, and having portions thereof shown in section.

FIGURE 14 illustrates the dispenser of FIGURE 13 in its dispensing position, and having portions thereof shown in section.

Referring to the drawings, there is shown in FIGURES 1 through 6 a metering dispenser 20 of the instant invention. As evidenced in FIGURES 1 through 4, the invention is applied to a conventional can type container to transform the same into a metering dispenser in which substantially equal predetermined amounts of material can be dispensed therefrom. Normally, a conventional container, e.g. a can 21 comprises essentially of a tubular member 22 defining the side walls of the container to which there are connected or attached a top end wall 23 and a bottom end wall 24. The upper end wall 23, depending on the can type may be provided with a means to define a spout or discharge 25 for the material contained therein. Accordingly, the discharge or spout 25 may be suitably sealed or closed by a suitable closure means. In the form of the invention illustrated in FIGURES 2 to 4, the discharge opening is capped by a plastic cap, the tip of which may be severed to define the discharge opening. Cans of their type have been popular for packaging liquid soap, detergents, and other products.

The bottom 24 of the can is generally secured by rolling the marginal portions of the bottom plate onto a flange 26 of the end wall to define the well known bead type seal 27.

In accordance with this invention, a means is provided whereby the conventional can 21, as described, may be converted into a metering dispenser in a relatively simple and inexpensive manner. This is attained by connecting adjacent the bottom end wall 24 of the can 21 a flexible diaphragm 28 to define with the bottom end wall 24 of the can an expandable chamber 29. As best seen in FIGURES 5 and 6, the flexible diaphragm 28 comprises a blank of readily foldable material, as for example, a sheet of plastic membrane, rubber, or the like which is reversely folded along a diametric portion. If desired, one or more such folds may be provided depending upon the size or volumetric expansion desired of the expandable chamber 29 as will be hereinafter described.

As best seen in FIGURE 1, the diaphragm 28 is secured by positioning diaphragm 28 between the bottom end wall 24 and the flange 26 of the can 21. Accordingly, a bead or gasket of a sealing means 30 is interposed between the peripheral portions of the diaphragm 28 and the end wall 24 of the can. A second bead or gasket 31 forming material is disposed on the marginal portion of the diaphragm 28. The marginal end portions of the bottom wall 24 of the can and the diaphragm 28 are then reversely folded in a well known manner to define a rim or bead 27 as indicated in FIGURE 3 in an exaggerated manner. In this manner, a fluid impervious seal is established with the diaphragm 28 firmly secured in position. In accordance with this invention, a very small vent opening 32 is formed in the bottom wall 24 of the can. Accordingly, the expandable chamber 29 defined between the bottom end wall of the can and the flexible diaphragm is vented to the atmosphere by the vent opening 32. Because the bottom 24 of the can is provided with a vent opening 32, it will be noted that the diaphragm must be formed of a fluid impervious material, as it forms the bottom wall of the container for containing the fluid. However, the membrane or diaphragm 28 requires very little structural strength as the weight of the fluid contained in the dispenser is for the most part still supported by the rigid bottom end wall 24 of the container, with the fold of the diaphragm disposed over the vent opening 32 therein. Thus for all practical purposes the bottom 24 of the can still functions as the main support of the fluid or contents of the container. Thus, with the container in the normal upright position as shown in FIGURE 4, the weight of the fluid therein maintains the diaphragm 28 collapsed against the end wall 24 of the container.

In accordance with this invention, the arrangement is such that a prescribed metered amount of the liquid is dispensed from the dispenser 20 upon each dispensing operation. When the container is tilted to a conventional dispensing position as shown in FIGURE 1, the tendency of the fluid to flow out through the discharge opening 25 of the container 21 causes air to be rushed into the expandable chamber 29 through the vent opening 32, thereby causing the diaphragm or chamber to inflate to a position as shown in FIGURE 1. Accordingly, the air occupying the expandable chamber 29 effects the displacement of a corresponding amount of fluid or material in the container which is discharged. Because the volume of the chamber 29 is fixed, the displacement occurring within the container is limited. Thus when the chamber 29 has reached its maximum expansion, dispensing of the fluid ceases because no more air is permitted to be drawn into the container. Best results are attained when the size or diameter of the discharge opening 25 is proportioned accordingly to the viscosity of the liquid or content of the container. Accordingly, the diameter or size of the discharge opening 25 should be proportioned so that the natural cohesive forces of the fluid forms a seal across the opening to prohibit the intake of air therethrough. For example, for dispensing a fluid having the viscosity of water, the size of the discharge opening 25 should be approximately five millimeters. For a liquid having the viscosity of a soap detergent, the diameter of the discharge opening should be enlarged to approximately seven millimeters. For dispensing a fluid having the viscosity of a syrup, a diameter of ten millimeters may be necessary. It has been discovered that by proper proportioning of the discharge opening to the viscosity of the liquid to be dispensed from the container, that dripping is eliminated.

FIGURES 7 and 8 illustrate a modified form of diaphragm construction. In this form, the diaphragm 28A is provided with a series of irregular ripples 33. Accordingly, when such a diaphragm 28A is disposed in a container 33 as described with reference to FIGURES 2 to 4, the ripples provide the expansion necessary to inflate the chamber 29 during a dispensing operation; as herein described.

FIGURE 9 illustrates still another modified form of the diaphragm construction. In this form, the diaphragm 28B is provided with a preformed pocket 34 which can be readily collapsed under the weight of the fluid supported thereon in the upright position of the dispenser. In the dispensing position the air drawn into the chamber 29 will inflate the pocket 34.

FIGURE 10 is a modified form of the invention in which the discharge opening 25A of the container 21A is defined by a threaded neck portion which is adapted to be closed by a conventional threaded cap structure 35 wherein the opening size X may be varied as herein described.

Accordingly, it will be readily understood that the flexible diaphragm 28, as described, utilized in a conventional can structure 21 transforms the same into a metering dispenser from which predetermined amounts of material can be accurately and positively dispensed. Thus the quantity of material to be dispensed is governed entirely by the displacement effected by the expansion of the expandable chamber. By controlling the displacement of the chamber 29, the amount of material disposed can be controlled.

FIGURES 11 and 12 illustrate a form of the invention adapted to a bottle type container. In this form, FIGURES 11 and 12 the dispenser 40 comprises a bottle container 41 of any suitable shape for containing the flowable material to be dispensed. In this form a metering top 42 is connected to the open end of the bottle 41. The metering or dispensing top 42 is illustrated as being threadedly engaged to the neck of the bottle container. However, it will be readily understood that the dispensing top 42 may be integrally formed or otherwise connected to the bottle or container 41. Therefore, this invention is in no way limited to the manner in which the dispensing top 42 may be secured to the container 41 of the dispenser.

As shown in FIGURES 11 and 12, the dispensing top 42 comprises a housing defined by a relatively rigid bottom wall 43 having a connected circumscribing side wall 44 and a top wall 45 to define a chamber 46. As shown therein, a flexible membrane or diaphragm 47, for example of thin sheet of rubber, plastic, or the like, impervious to air and liquid, is stretched across the top of the housing within the chamber. Accordingly the volume defined between the diaphragm 47 and the bottom wall 43 is rendered variable as will be described. The interior of this variable chamber 46 is vented to the interior of the container 41 through a vent opening 48 formed in the bottom wall 43 of the housing.

A depending neck portion 49, integrally formed to the housing provides the means whereby the top 42 is secured or connected to the upper end of the container 41.

The housing is provided with spout or discharge means in the form of a conduit 50 which has one end 50A in communication with the interior of the container 41 and forms the means from which the liquid or fluid within the container is dispensed upon a tilting of the container 41 as shown in FIGURE 12.

In this form of the invention, the top wall 45 of the housing is provided with an aperture or opening 51 to expose the exterior surface 47A of the flexible membrane or diaphragm 47 to the atmosphere. If desired, the opening 51 in the top 45 may be sufficiently large so as to accommodate one's finger.

In the dispensing top described, the flexible diaphragm 47 defines with the bottom wall 43 of the housing and the circumscribing side walls 44 an expandable chamber 46. In the upright condition, or non-dispensing position, the diaphragm 47 is disposed so as to define the maximum volumetric position of the expandable chamber 46. Accordingly, when the dispenser described is tilted to a pouring position as indicated in FIGURE 12, the tendency of the liquid to flow out through the spout 50 is such that it will tend to draw the air from the chamber 46 and into the container 41 through the vent opening 48 to result in a corresponding metered amount or quantity of the liquid in the container to be discharged through the spout 50. In doing so, the flexible diaphragm 47 is distorted to a position indicated in FIGURE 14 as the pressure of the atmospheric air acting thereon is greater than the pressure within the chamber. Thus, when the maximum amount of air has been pulled from the expandable chamber 46 so that no further displacement is possible, the flow of material from the container 41 through the spout 50 ceases. Consequently, no more material can be dispensed from the container 41 until it has been again uprighted so as to establish the equilibrium. Equilibrium is established upon uprighting the container 41 by the air in the container above the level of the material venting back into the expandable chamber 46 so that the pressure on either side of flexible diaphragm 47 is again equalized. Thus, to effect another dispensing operation, the operator need only to again tilt the dispenser 40 into a position shown in FIGURE 12, thereby permitting another equal predetermined amount of fluid to be dispensed therefrom in the manner herein described.

In the event an additional amount of material is desired to be dispensed from the container 41, one may by inserting his finger through the opening 51 in the top of housing top depress the diaphragm 47 still further. In so doing, additional air is forced from the expandable chamber 46 into the container 41 thereby causing a corresponding amount of liquid to be dispensed therefrom.

In this form of the invention, as in the one previously described with respect to FIGURES 1 to 10, the diameter of the discharge opening of the spot 50 should be proportioned in accordance to the viscosity of the liquid to be dispensed from the dispenser for best results. Accordingly, the heavy or greater the viscosity of the material the larger the diameter opening of the discharge spout 50 should be.

FIGURES 13 and 14 illustrate still another further modified form of the invention. In this form of the invention the container portion 56 of the dispenser 55 is substantially similar to that hereinbefore described. However, the dispensing top 57 is modified. As shown, the dispenser top 57 comprises a rigid bottom wall 58 having connected thereto a circumscribing side wall 59 and a top wall 60. In this form of the invention, the top wall 60 is rendered inpervious.

In accordance with this form of the invention, there is disposed within the housing or top 57 defined a flexible diaphragm 61 which is suitably secured therein. The diaphragm 61 defines with the upper wall portion 60 of the housing an expandable chamber 62. As shown in FIGURE 13, the diaphragm 61 is weighted by a suitable weight 63 to its expanded or inflated position as shown in the upright or non-dispensing position. Accordingly, the expandable chamber 62 defined between the diaphragm 61 and the upper wall 60 of the housing defines the expandable chamber 62 which is normally expanded in the upright and non-dispensing position of the container.

In this form of the invention, a venting means in the form of a tube 64 connects the interior of the expandable chamber 62 in communication with the interior of the container 56. The venting tube 64 is provided with a opening sufficiently large to vent the air between the chamber 62 and the interior of the container 41 but small enough to prohibit the fluid in the container to flow therethrough. A spout 65 as hereinbefore described is included in the housing, and it has its lower end portion being connected into communication with the interior of the container.

In this form of the invention, the exterior surface 61A of the diaphragm 61 is vented to the atmosphere by means of a vent opening 66 formed in the side wall 59 of the dispenser top 57. Accordingly, it is to be noted that the position of the vent opening 66 is located so that it is always disposed to the exterior of the expandable chamber 62.

In operation, as seen in FIGURE 14, whenever the dispenser 55 is tilted into a pouring position, there is the tendency of the air in the expandable chamber 62 to evacuate through the vent tube 64 into the container 56 whereby due to the difference in pressure acting on the diaphragm 61 causes the same to collapse into a position indicated in FIGURE 14. Consequently, a corresponding amount of liquid is displaced from the container 56 through the spout 65. Accordingly, when all the air that is possible to be evacuated from the expandable chamber 62 has been accomplished, the flow of material dispensing therefrom automatically ceases. Equilibrium is re-established when the container 55 is righted to the position of FIGURE 13 as hereinbefore described.

Therefore, from the foregoing, it is to be noted that displacement necessary to effect the flow of liquid from the dispenser is limited to the volumetric displacement which occurs by the inflation or deflation of the expandable chamber as defined by a flexible membrane. Accordingly, a positive acting and a reliably controlled means is provided for controlling the amount of air which is permitted to enter the container portion of the dispenser so as to effect a corresponding displacement of the liquid therein.

While the invention has been described with reference to several embodiments thereof, it will be readily appreciated and understood that variations and modifications of the invention may be made without departing from the scope or spirit of the invention.

What is claimed is:
1. A dispensing top adapted for an open-top container adapted to contain a quantity of flowable material comprising:
   a housing,
   said housing having a top wall and a bottom wall and a circumscribing side wall interconnecting said top wall and bottom wall,
   means connected to said housing to define a pouring spout, the inlet to said spout extending below said bottom wall,
   a flexible diaphragm connected in said housing between said top and bottom walls to define with one of said walls an expandable chamber,
   and means to vent said expandable chamber through said bottom wall.

2. A metering device comprising a container having an open upper end,
   (a) a housing connected to the open upper end of a container to form a top therefor,
   (b) said housing having a bottom wall portion adapted to extend across the open end of said container,
   (c) means connected to said housing to define a pouring spout, the inlet to said spout connecting in communication with the interior of said container,
   (d) a flexible diaphragm connected in said housing to define with said bottom wall portion an expandable chamber,
   (e) vent to means in the bottom wall to vent the interior of said chamber,
   (f) and, said diaphragm having its exterior surface exposed to the atmosphere so that the pressure on either side of said diaphragm can be equalized in the inoperative position thereof.

3. The invention as defined in claim 2 and including a top wall overlying said diaphragm, said top wall having an opening therein for exposing said diaphragm to atmospheric pressure.

4. A metering device comprising a container having an open upper end, a metering top connected to the upper end of the container, said metering top including
   (a) a housing connected to the open end of a container,
   (b) said housing including spaced upper and lower wall portions interconnected by a circumscribing side wall portion, said upper wall portion of said housing being imperforate,
   (c) means connected to said housing to define a pouring spout, the inlet to said spout connecting in communication with the interior of said container,
   (d) a flexible diaphragm connected in said housing to define with said imperforate top wall portion an expandable chamber, said diaphragm being normally disposed in spaced relationship to and between said upper and lower wall portions of said housing,
   (e) means venting said expandable chamber to the interior of a container, whereby upon tilting of the container to a dispensing position the diaphragm collapses to effect displacement of a predetermined volumetric amount of material from said container which is proportional to the displacement effected by the collapse of said diaphragm,
   (f) and means for venting the exterior surface of the diaphragm to the atmosphere so that the pressure on either side of said diaphragm can be equalized in the inoperative position thereof.

5. The invention as defined in claim 4 and including means for weighting said diaphragm in the inoperative position thereof.

6. A metering dispenser for automatically determining the flow of a material upon dispensing a predetermined measured amount of said material comprising:
   (a) a container having an open end,
   (b) a dispensing top connected to the open end of said container,
   (c) said top comprising a housing having a wall portion extending across the open end of said container,
   (d) a flexible diaphragm disposed within said housing to define with said wall portion of collapsible chamber,
   (e) means for venting said collapsible chamber to the air space in the interior of said container,
   (f) and means for exposing one side of said diaphragm to atmosphere whereby in the normal inoperative position of said dispenser, said chamber is normally expanded so that in a dispensing operation the tendency of the material to discharge causes the air in said chamber to evacuate into said container whereby a corresponding metered amount of material is dispensed,
   (g) and, a spout connected in communication with the interior of said container to define a discharge for said material being dispensed.

7. A metering dispenser for automatically determining the flow of predetermined equal quantities of flowable material therefrom on each dispensing operation comprising:
   (a) a container adapted to contain a supply of said flowable material, (b) said container having an open end, (c) a metering top connected to said open end, (d) said metering top comprising a housing, (e) a flexible diaphragm disposed within said housing whereby said diaphragm defines an expandable metering chamber which is normally extended in the inoperative position of said dispenser, and distended in the dispensing position of said dispenser, (f) means for venting the chamber to the air space interior of said container, (g) means for exposing the surface of said diaphragm externally of said chamber to said atmosphere, (h) means for maintaining said diaphragm in the extended position thereof in the inoperative position of said dispenser, and weight means connected to said diaphragm to effect the collapse thereof in a dispensing position, (i) and means defining a spout in communication with the interior of said container for dispensing the material therefrom in the operative position.

8. A metering dispenser for automatically determining the flow of predetermined metered amounts of flowable material therefrom comprising:

(a) an open end container adapted to define a reservoir for the flowable material, (b) a metering top connected to the open end at the top of the container to define the top of the dispenser whereby said metering top is normally disposed above the flowable material contained in the container, (c) said metering top comprising a housing having a rigid bottom wall portion, a top wall portion spaced therefrom, and a circumscribing side wall connecting said top and bottom wall portions in spaced relationship, (d) a flexible diaphragm impervious to the material contained in said reservoir disposed within said housing define with the wall portions thereof an expandable chamber, (e) means for venting the interior of said chamber to the air space interior of said container, (f) said housing having an opening therein for exposing the side of said diaphragm exterior to said chamber to the atmosphere, (g) and, a spout means disposed in communication with the interior of said container whereby the predetermined measured amount of liquid dispensed from said dispenser upon tilting of the same is controlled by the amount of air evacuated from said chamber to the interior of said container, whereby the size of said spout opening is proportional to the viscosity of the flowable material.

References Cited by the Examiner

UNITED STATES PATENTS

| 2,673,013 | 3/1954 | Hester | 222—386.5 |
| 3,055,556 | 9/1962 | Hester | 222—212 |
| 3,120,330 | 2/1964 | Ermecke | 222—386.5 |

FOREIGN PATENTS

| 609,223 | 9/1948 | Great Britain. |

ROBERT B. REEVES, *Primary Examiner.*

STANLEY H. TOLLBERG, *Examiner.*